(12) United States Patent
Specht

(10) Patent No.: US 6,682,098 B2
(45) Date of Patent: Jan. 27, 2004

(54) METHOD OF DETERMINING THE LOAD ON A VEHICLE OCCUPANT

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 100 days.

(21) Appl. No.: 10/135,567

(22) Filed: May 1, 2002

(65) Prior Publication Data

US 2003/0094327 A1 May 22, 2003

(30) Foreign Application Priority Data

Nov. 20, 2001 (DE) .......................................... 101 56 837

(51) Int. Cl.$^7$ .......................................... B60R 22/353
(52) U.S. Cl. ........................ 280/806; 280/805; 180/268; 297/470; 297/479; 297/480; 340/901; 340/903; 340/429; 340/428; 340/438; 340/457.1; 200/61.45 R; 200/61.46
(58) Field of Search .................... 180/268; 280/805, 280/806; 297/470, 479, 480; 640/901, 903, 429, 428, 438, 457.1; 200/61.45 R, 61.46

(56) References Cited

U.S. PATENT DOCUMENTS

| | | | | |
|---|---|---|---|---|
| 4,714,274 A | * | 12/1987 | Nagashima | 280/801.1 |
| 4,919,450 A | * | 4/1990 | Doty et al. | 280/803 |
| 5,165,718 A | * | 11/1992 | Hamaue | 280/806 |
| 5,533,756 A | * | 7/1996 | Dybro et al. | 280/806 |
| 6,053,532 A | * | 4/2000 | Wilkins et al. | 280/806 |
| 6,186,431 B1 | * | 2/2001 | Biller et al. | 242/374 |
| 6,290,159 B1 | | 9/2001 | Specht et al. | 242/379.1 |
| 6,447,012 B2 | * | 9/2002 | Peter et al. | 280/806 |
| 6,499,554 B1 | * | 12/2002 | Yano et al. | 180/268 |
| 6,513,616 B2 | * | 2/2003 | Bacher et al. | 180/268 |
| 6,527,299 B2 | * | 3/2003 | Specht et al. | 280/806 |
| 6,533,316 B2 | * | 3/2003 | Breed et al. | 280/735 |

FOREIGN PATENT DOCUMENTS

| | | | |
|---|---|---|---|
| DE | 9717477 | | 11/1997 |
| DE | 29717477 | * | 11/1997 |
| DE | 19731689 | * | 2/1999 |
| DE | 197 31 689 A1 | | 2/1999 |
| DE | 19902483 | * | 8/2000 |
| DE | 199 02 483 A1 | | 8/2000 |
| DE | 199 57 802 A1 | | 6/2001 |
| DE | 19957802 | * | 6/2001 |
| WO | 8504628 | | 10/1985 |
| WO | WO 85/04628 | | 10/1985 |

* cited by examiner

Primary Examiner—Harold J. Tudor
Assistant Examiner—John Richardson
(74) Attorney, Agent, or Firm—Lonnie Drayer

(57) ABSTRACT

The load acting on the body of a belted-in vehicle occupant restrained by a seat belt is determined by providing electrical signals from occupant restraint device sensors. The electrical signals are then evaluated with an evaluating device, wherein the movement of a seat belt webbing influenced by the body of the belted-in vehicle occupant is scanned and a corresponding signal is fed to the evaluating device.

34 Claims, 3 Drawing Sheets

METHOD OF DETERMINING THE LOAD ON A VEHICLE OCCUPANT

FIELD OF THE INVENTION

The invention relates to a method for determining the load acting on the body of a vehicle occupant restrained by a seat belt, wherein electrical signals from occupant restraint device sensors are evaluated in an evaluating device.

BACKGROUND OF THE INVENTION

DE 297 17 477 U1 teaches a seat belt retractor in which the winding state of the seat belt is determined by a belt reel sensor, which, acting as an incremental sensor, detects the rotational position of the belt reel. The corresponding signals are fed together with other sensor signals to an electronic unit present in the vehicle, which contains a microcomputer with microprocessor and associated memories, for evaluation of the signals. Depending on the signal evaluation, given safety devices of the vehicle occupant restraint system, such as a belt tightener, an airbag, a belt buckle and the like are actuated.

It is known from WO 85/04628 to trigger the blocking device, with which the belt reel is blocked in the seat belt retractor, as a function of rotational angle signals that are obtained from scanning of the belt reel.

It is further known from U.S. Pat. No. 6,290,159 B1 to adjust the restraining force of a belt force limiter as a function of signals obtained from scanning of the rotating movement of the blocked belt reel.

In the present invention the movement of the webbing of the seat belt caused by the body of the belted-in vehicle occupant is scanned and a corresponding electrical signal is fed to the evaluating device. The webbing movement may be a webbing movement directed in the webbing take-up direction by a belt tightener drive or a webbing extraction movement. The webbing extraction movement may be caused by forward displacement of the belted-in vehicle occupant or by a webbing extraction movement effected manually by the vehicle occupant. The webbing extraction movement effected in particular by forward displacement, for example by increased acceleration, may be effected against a restraining force with a given force characteristic curve. The force characteristic curve may correspond substantially to the profile of a spring force characteristic curve. Scanning is preferably performed of webbing movement that takes place against the restraining force of a force limiter in which energy is absorbed by material deformation. Such a belt force limiter may take the form of a torsion bar, which is arranged inside the belt reel. Such a belt force limiter is known from U.S. Pat. No. 6,290,159 B1 for example.

SUMMARY OF THE INVENTION

There is provided in accordance with the present invention a method for determining the load acting on the body of a belted-in vehicle occupant restrained by a seat belt comprising the steps of providing electrical signals from occupant restraint device sensors; and evaluating said electrical signals with an evaluating device, wherein the movement of a seat belt webbing influenced by the body of the belted-in vehicle occupant is scanned and a corresponding signal is fed to the evaluating device.

DETAILED DESCRIPTION OF THE INVENTION

Figure 1:
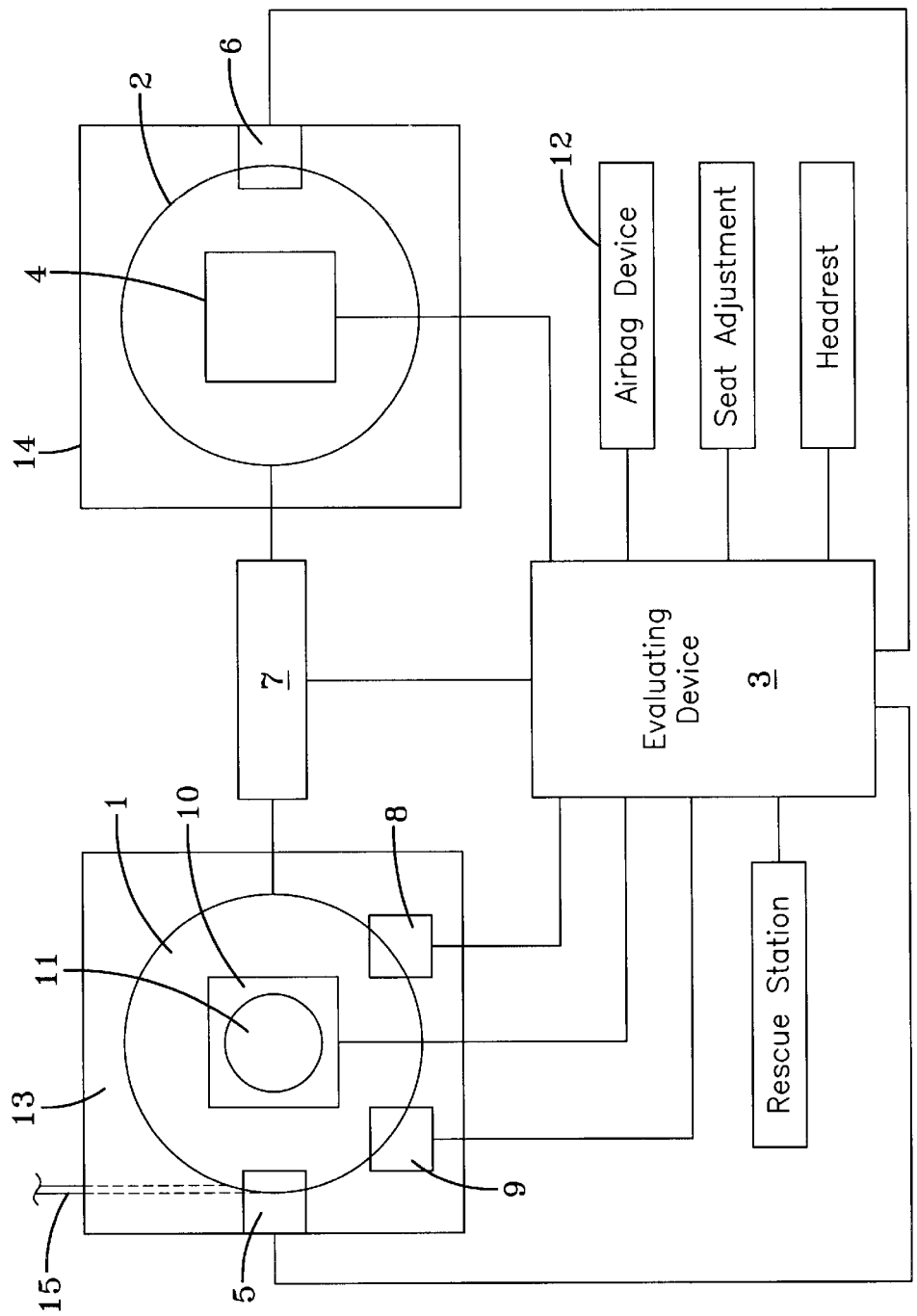
FIG. 1 is a block diagram of an exemplary embodiment of a device with which the invention may be performed.

FIG. 1 is a block diagram of an exemplary embodiment of a device with which the invention may be performed. A belt reel 1 is arranged in a seat belt retractor 13, in particular a seat belt retractor that is a component of a three-point seat belt system of a motor vehicle, for retraction and extraction of seat belt webbing 15. Torque from a belt tightener drive, in particular an electric motor 14 is transmitted to the belt reel 1 via a rotor 2. The rotor 2 is preferably the rotor of the electric motor 14, but may be a rotor arranged outside the belt tightener drive. A torque transmission device 7, which may take the form of a clutch, a gear and the like, is located between the rotor 2 and the belt reel 1. The torque transmission device 7 may be externally controlled or automatically switchable. The torque transmission device may comprise a damping device with particular damping behavior.

The drive force generated by a belt tightener may be transmitted to the belt reel with particular damping behavior, exhibited by the force transmission section between belt tightener and belt reel. From determination of the belt webbing movement, in particular in the webbing take-up direction or by scanning the rotational angle of the belt reel, and the known damping behavior of the force transmission section, the force or load exerted by the seat belt on the vehicle occupant may be determined. The force limiting behavior of a belt force limiter may be adjusted as a function thereof.

In the exemplary embodiment, a rotational angle sensor 5 is provided for scanning the extraction or take-up movement of the seat belt webbing 15, which is not shown in any more detail. The rotational angle sensor 5 supplies electrical signals to an evaluating device 3 that are proportional to the respective rotational angles of the belt reel 1.

Belt webbing movement is preferably scanned within the elastic deformation range of the belt force limiter. In this way, early detection of the forces exerted on the body of the vehicle occupant via the applied seat belt is achieved. The severity of the crash may be determined by corresponding evaluation of the profile over time of the change in extracted webbing length and/or the webbing extraction speed and/or the webbing extraction acceleration. Scanning of the rotating movement, in particular rotational angle scanning, of the belt reel may be carried out in this respect.

A rotational angle sensor 6 supplies electrical signals to the evaluating device 3 that are proportional to the respective rotational angles of the rotor 2 of the electric motor 14.

The evaluating device 3 preferably is an electronic unit, which includes a microcomputer with microprocessor and associated memories. Interfaces are provided in a known manner for converting the electrical signals coming from the rotational angle sensors 5, 6 into computer-readable formats and for converting the data coming from the microcomputer of the evaluating device 3 for actuation of peripheral devices, in particular the safety devices of the vehicle occupant restraint system.

The evaluating device 3 is preferably be a component of a central computer unit in the motor vehicle, wherein the electrical signals from the rotational angle sensors and the signals output by the evaluating device are conveyed via a serial bus system of the vehicle, for example a CAN bus.

In determining the severity of a crash, in particular determining the load acting on the body of a vehicle occupant restrained by the seat belt of the device described, only the rotational angle sensor 5 for the belt reel 1, a belt force limiter 11 and the evaluating device 3 are necessary. The belt force limiter 11 is preferably constructed such that its energy-absorbing action is achieved by deformation of a component. To this end, the belt force limiter 11 preferably is a torsion bar, which is incorporated in a known way in the belt reel 1, for example as taught in U.S. Pat. No. 6,290,159 B1.

Scanning of the rotating movement of the belt reel allows detection of the size of the locking path of the locking device, in particular the blocking catch, upon main locking of the belt reel during normal operation and preferably after tightening. For simplified unlocking, the belt reel is turned in the opposite rotational direction, preferably by the electromotive drive, over an angular range corresponding at least to the locking path.

In conjunction with determination of the longitudinal positioning of the seat occupied by the vehicle occupant and the length of webbing extracted from the parked position, a fundamental value may be obtained for the weight of the belted-in vehicle occupant, in particular by scanning the rotational angle of the belt reel. As a function of this fundamental value, restraint parameters may then be preset, in particular stages of the belt webbing force limiter, for example the torsion bar.

If, in a crash, the vehicle occupant in the vehicle seat is displaced forwards after blocking of the blockable belt reel portion against further rotation, the body of the vehicle occupant is restrained with a restraining force preset by the belt force limiter, against which restraining force the rotatable belt reel portion rotates with force-limited belt extraction. Deformation of the belt force limiter initially proceeds within the elastic deformation range, wherein there occurs a change over time in the rotational angle according to FIG. 2A or 3A from the time $t_0$, which is the start of belt force limiter deformation, to the time $t_1$, which is the end of elastic deformation of the belt force limiter. Deformation going beyond $t_1$ lies within the plastic deformation range of the belt force limiter. In the plastic deformation range, the change over time in the rotational angle of the belt reel 1 is substantially linear. FIGS. 2B or 3B and 2C or 3C show the changes over time in rotational angle speed and rotational angle acceleration respectively. The rotational angle is measured by the rotational angle sensor 5 for the belt reel 1 and supplied to the evaluating device 3. The curve shown in FIG. 2A or 3A for the profile over time of the change in rotational angle is then obtained from the respective measured rotational angle values. A first differentiation then proceeds in the evaluating device 3 after the time required for detecting the change over time in the rotational angle speed in accordance with the graphic representation in FIG. 2B or 3B. From a further differentiation procedure there is then obtained the change over time in rotational angle acceleration according to FIG. 2C or 3C.

From this evaluation, in particular by comparison with stored curve profiles, the severity of the crash may be determined. Appropriate curve profiles may be defined as threshold values. If these are reached or exceeded, appropriate safety devices, for example additional power tightening of the seat belt, are activated. To this end, corresponding signals may be supplied from the evaluating device 3 to a control device 4 for controlling the power supply to the electric motor 14. Corresponding electrical activation signals may be supplied from the evaluating device 3 to an airbag device 12, wherein a given inflation level may optionally be preset for the airbag to be activated. Seat position and seat back adjustment, headrest adjustment etc. may be activated.

Figure 2A:
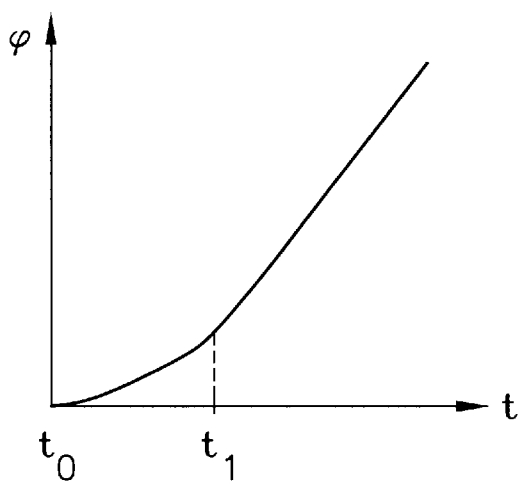
FIG. 2A is a graphic representation of the change over time in the rotational angle of the belt reel in the event of a major crash.
Figure 2B:
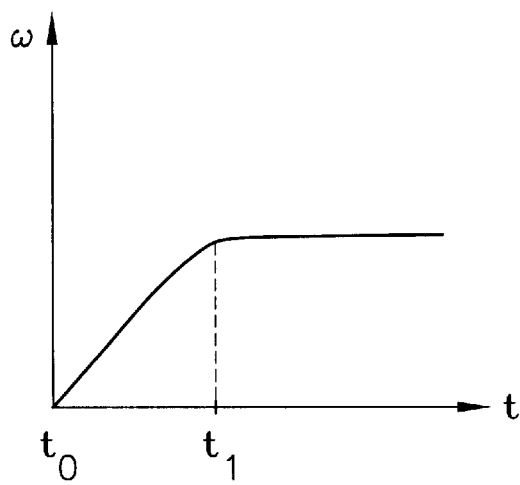
FIG. 2B is a graphic representation of the change over time in the rotational angle speed of the belt reel in the event of a major crash.
Figure 2C:
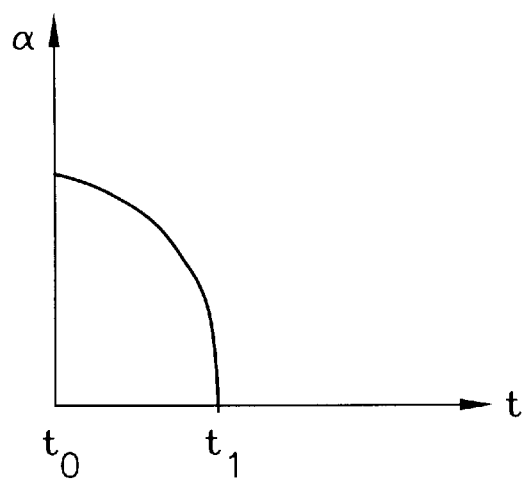
FIG. 2C shows the change over time in rotational angle acceleration of the belt reel in the event of a major crash.

FIG. 2A shows the curve profile for the change over time in the rotational angle of the belt reel 1, resulting from the respective electrical signals of the rotational angle sensor 5, for a major crash. FIG. 2C shows the profile over time, resulting therefrom, of the rotational angle acceleration, which is proportional to the load exerted on the body of the vehicle occupant by the seat belt webbing.

Figure 3A:
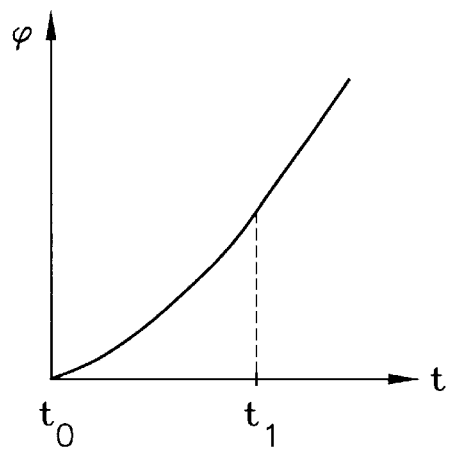
FIG. 3A is a graphic representation of the change over time in the rotational angle in the event of a minor crash.
Figure 3B:
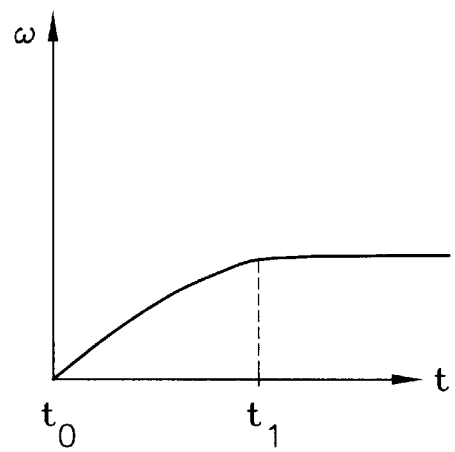
FIG. 3B is a graphic representation of the change over time in rotational angle speed in the event of a minor crash.
Figure 3C:
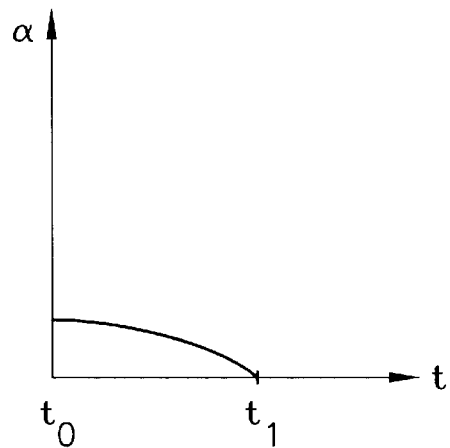
FIG. 3C is a graphic representation of the change over time in rotational angle acceleration in the event of a minor crash.

FIG. 3A shows the change over time in the rotational angle of the belt reel 1 in a minor crash. FIG. 3C shows the resultant change over time in rotational angle acceleration.

In FIGS. 2A–2C and 3A–3C it is clear that a statement is obtained over the severity of the crash by the electrical signals of the rotational angle sensor 5 which scans the rotating movement of the belt reel 1. The severity of the crash is preferably established within the range of elastic deformation of the energy absorber, i.e. within the period $t_0$ to $t_1$. A very early statement is then obtained about the severity of the crash. The corresponding safety devices, such as a belt tightener, airbag system and optionally seat back adjuster and headrest adjuster, are then initiated as a function thereof. This is effected by corresponding signaling by the evaluating device 3. The profiles over time of the acceleration changes according to FIGS. 2C and 3C in particular show clear differences as a function of the severity of the crash.

The result of crash severity determination may optionally be stored in the evaluating device 3 for transmission of these data for the initiation of appropriate rescue measures. For example, the information may be transmitted to a rescue station by telecommunication. Furthermore, information about seat occupancy and thus the number of vehicle occupants may be obtained from the respective electrical signal or from the corresponding measurement data.

With the above-described mode of operation of the exemplary embodiment, only the electrical signals of the rotational angle sensor of the belt reel 1 are required for evaluation in the evaluating device 3. As a function of these electrical signals, further functions of the seat belt retractor and seat belt system may be controlled and monitored. This may for example comprise the detection of a reference variable for the length of extracted belt webbing after application of the seat belt and after removal of any belt slack which may be present. Furthermore, excessive belt webbing extraction may then be detected if the vehicle occupant is out of position (OOP). During normal travel, belt slack may be measured and detected on the basis of the reference variable of the belt webbing extraction length.

Locking of the belt reel may be detected due to stopped belt extraction. In connection with the longitudinal seat position and the length of webbing extracted from the parked position, it is possible to obtain a measured variable for the weight of the vehicle occupant, wherein, as a function of this measured variable, presetting of the safety devices, in particular the force limiter stage, may be performed using an adjusting device 10. If a given length of extracted belt webbing is exceeded, the seat belt retractor may be adjusted into a blocking readiness state, in particular a preblocking stage, for child seat restraint or for restraining a large object on the vehicle seat, in particular it may assume a preblocking state. This operating state may be established by an appropriate, in particular electromagnetic actuating device 9, which may act on a preblocking catch and is triggered by the evaluating device 3.

The webbing extraction speed or acceleration or the rotational angle speed or acceleration of the belt reel, which are available as electrically or electronically detected measurement data, may be used for a belt webbing sensor (web sensor) function. Upon actuation, the centrifugal force-sensitive belt webbing sensor conventionally produces a connection between the belt reel and a control element to bring about blocking readiness, in particular the preblocking stage of the seat belt retractor. In this way, the seat belt retractor may be adjusted into blocking readiness, for example a preblocking stage. However, it is also possible to use the belt webbing sensor function for direct adjustment of the belt reel into its blocked state. In this respect, an electromagnetic actuating device may be used to actuate the blocking device, in particular a blocking catch.

If the torque transmission device 7, which constitutes the force transmission section between the belt tightener drive, for example the electric motor 14, and the belt reel 1, exhibits predetermined damping behavior due to a damping device, early determination of the force acting between the seat belt and the belted-in vehicle occupant may be achieved. Due to the scanned belt extraction or rotational angle of the belt reel 1 and the known damping behavior, the force exerted on the body of the vehicle occupant by the seat belt webbing may be determined in the evaluating device 3.

Figure 4:
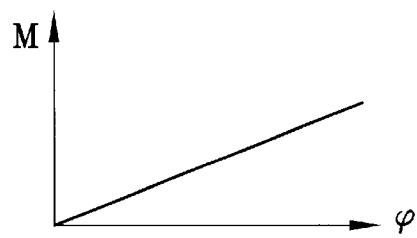
FIG. 4 is a graphic representation for determining the force, influenced by damping behavior, which is exerted on the belted-in vehicle occupant upon tightening of the seat belt.

FIG. 4 is a graphic representation for determining the force, influenced by damping behavior, which is exerted on the belted-in vehicle occupant upon tightening of the seat belt. The belt webbing is extracted from the belt reel 1 with particular damping behavior in the case of force-limited belt webbing extraction. The rotational angle values are plotted on the x-axis and the belt force values on the y-axis, the latter being influenced by the damping behavior. To this end, a damping element is activated when the seat belt retractor is locked. As a function of the measured rotational angle of the belt reel 1, the belt force acting on the body of the vehicle occupant may then be determined in the evaluating device 3. The adjusting device 10 for the belt force limiter may be triggered as a function of this belt force determination. In this way, an adjustment of the force limiting behavior of the belt force limiter conformed to the respective load may be achieved as a function of the body size and body weight of the belted-in vehicle occupant.

In combination with the electrical signals of the rotational angle sensor 6, which scans the rotating movement of the rotor 2, in particular the electric motor rotor, further functions, in particular diagnostic and monitoring functions, may be obtained for the seat belt system.

In the event of simultaneous interrogation of belt reel 1 and rotor 2 with regard to rotational angle, it may be established by appropriate association, in particular comparison, of the electrical signals of the two rotational angle sensors 5, 6 in the evaluating device 3, whether the seat belt retractor 13 is properly fulfilling the desired function. For example, it may be detected whether the torque generated by the belt tightener drive, in particular the electric motor 14, for tightening the belt webbing is transmitted to the belt reel 1 via the torque transmission device 7, in particular the clutch. For example, "overtaking" of the belt webbing retraction effected by the electric motor 14 by the return force acting on the belt reel 1 of the motive spring of the seat belt retractor 13 may be detected. This "overtaking" creates the risk that the clutch acting between the belt tightener drive, in particular the electromotive drive, and the belt reel will not engage properly, such that, when the motive spring finishes acting, the torque supplied by the belt tightener drive, in particular the electric motor, is not transmitted to the belt reel and is lost. In this case, the belt reel 1 rotates at a higher rotational angle speed than is achieved by the belt tightener drive, in particular the electric motor 14. Brief switching off may then be effected by an appropriate command to the control device 4 of the electric motor 14, such that, as the effect of the motive spring subsides or the motive spring action is ended, the electric motor 14 is started again and the torque transmission device 7 transmits the torque from the electric motor 14 to the belt reel 1 after engagement of the clutch or the like. The torque transmission device 7 may to this end be triggered appropriately by an electrical signal from the evaluating device 3. By the combined evaluation of the belt extraction movement and the rotating movement of the rotor, which transmits the torque generated for tightening, such overtaking may be detected early. The motive tightener drive may then be briefly switched off and switched on again when the clutch is properly engaged. The following diagnosis and monitoring functions are additionally provided.

Situations may be detected in which emergency locking of the belt reel 1 of the seat belt retractor 13 is necessary. Such a situation may arise when seat belt tightening starts too late and the body of the vehicle occupant is already in the forward displacement phase. The retraction force generated by the tightener drive may be too slight in the initial phase to stop the forward displacement of the vehicle occupant. In this case, the belt webbing 15 is extracted from the belt reel 1 in the extraction direction despite the belt tightener drive being switched on. This situation may be detected by combined scanning of the rotor transmitting the tightener torque and the belt reel. To stop the forward displacement of the vehicle occupant, emergency locking of the belt reel is then activated, preferably an electromagnetically actuated catch, which blocks further rotation of the belt reel.

Emergency locking may be triggered by a signal from the evaluating device 3 supplied to an emergency locking device 8, if, when the electric motor 14 is switched on, the belt reel 1 is turned in the belt extraction direction to tighten the seat belt. The emergency locking device 8 may to this end comprise an electromagnetic actuator, which acts on the main locking catch for the belt reel 1.

To simplify unlocking of the belt reel, an unlocking signal may be supplied to the control device 4 of the electric motor 14, such that the belt reel 1 is turned in the opposite direction at least by a rotational angle corresponding to the locking path.

Many changes and modifications in the above described embodiment of the invention can, of course, be carried out without departing from the scope thereof. Accordingly, that scope is intended to be limited only by the scope of the appended claims.

I claim:

1. A method for determining the load acting on the body of a belted-in vehicle occupant restrained by a seat belt comprising the steps of:
providing electrical signals from occupant restraint device sensors; and
evaluating said electrical signals with an evaluating device, wherein the movement of a seat belt webbing influenced by the body of the belted-in vehicle occupant is scanned and a corresponding signal is fed to the evaluating device, wherein a locking path of a belt reel covered in reaching a state blocked against webbing extraction is measured and, on unlocking, the belt reel is turned in the opposite direction at least over an angular zone corresponding to the locking path, in particular by the torque generated by the electrical drive.

2. The method of claim 1, wherein a belt extraction movement is measured which proceeds against a restraining force with a given characteristic curve.

3. The method of claim 2, wherein the force characteristic curve corresponds substantially to the profile of a spring force characteristic curve.

4. The method of one of claim 1, wherein the seat belt webbing movement is scanned which takes place against the restraining force of a belt force limiter which absorbs energy by deforming a belt force limiter.

5. The method of claim 4, wherein the seat belt webbing movement is scanned within the elastic deformation range of the belt force limiter.

6. The method of claim 1, wherein the severity of a crash is determined upon evaluation of the electrical signals representing the webbing movement.

7. The method of one claim 1, wherein a profile over time of a change in extracted webbing length and/or webbing extraction speed and/or webbing extraction acceleration is detected.

8. The method of claim 1, wherein the rotating movement of the belt reel of the seat belt retractor is scanned.

9. The method of claim 7, wherein the profile over time of the change in the rotational angle of the belt reel and/or the rotational angle speed of the belt reel and/or the rotational angle acceleration of the belt reel is/are detected.

10. The method of claim 1, wherein determination of the webbing speed or webbing extraction acceleration is used as a belt webbing sensor function.

11. The method of claim 1, wherein an electrical signal and/or a result obtained from evaluation of the electrical signal is/are stored.

12. The method of claim 1, wherein an electrical signal and/or a result obtained from evaluation thereof is used as an indication of seat occupancy.

13. The method of claim 1, wherein an electrical signal and/or a result obtained from evaluation of the electrical signal is compared with at least one corresponding threshold value.

14. The method of claim 1, wherein at least one safety device of the vehicle occupant restraint system is activated as a function of the electrical signal and/or the result determined upon evaluation.

15. The method of claim 13, wherein at least one safety device of the vehicle occupant restraint system is activated if the threshold value is reached or exceeded.

16. The method of claim 11, wherein the information obtained from the measurement data and/or the result determined from evaluation of the measurement data is retrieved or passed on by telecommunication.

17. The method of claim 16, wherein the information is transmitted to a rescue station.

18. The method of claim 1, wherein torque generated by a drive is transmitted to the belt reel of the seat belt retractor for control of at least one safety device of the vehicle occupant restraint system.

19. The method of claim 17, wherein an electrical drive is used.

20. The method of claim 18, wherein the torque is transmitted to the belt reel with given damping behavior.

21. The method of one claim 18, wherein the load exerted on the belted-in vehicle occupant by the seat belt is determined from the measurement result for webbing movement and/or belt reel movement and the damping behavior.

22. The method of claim 21, wherein the force limiting behavior of the belt force limiter is adjusted as the function of the determined load.

23. The method of claim 1, wherein, in addition to scanning of the webbing movement, in particular the rotating movement of the belt reel, the rotating movement of a rotor is scanned, by which a torque generated by a drive is transmitted to the belt reel of the seat belt retractor and corresponding measurement data are supplied to the evaluating device.

24. The method of claim 23, wherein the rotating movement of the electric motor rotor is scanned.

25. The method of claim 18, wherein functions of components of the seat belt system are diagnosed or monitored from the measurement data relating to webbing movement and rotor movement, in particular the rotating movements of the belt reel and rotor.

26. The method of claim 25, wherein the scanning measurement data relating to webbing movement and rotor movement, in particular the rotating movements of the belt reel and the rotor, are compared with desired values.

27. The method of claim 1, wherein, after belting-in, the length of the extracted seat belt webbing is measured as a reference variable.

28. The method of claim 27, wherein the belted-in occupant may be detected as being out of position from a length of extracted webbing exceeding the reference variable.

29. The method of claim 27, wherein a reference variable is measured after removal of belt slack.

30. The method of claim 27, wherein belt slack arising during operation of the vehicle is determined by comparing the length of extracted webbing with the reference variable.

31. The method of claim 1 wherein locking of the belt reel is detected from the measurement data obtained from belt extraction scanning or belt reel rotation.

32. The method of claim 1, wherein, in the event of tightening of the seat belt, the webbing movement is scanned, in particular by scanning of the rotating movement of the belt reel, and, if belt extraction is measured, locking of the belt reel is activated.

33. The method of claim 1, wherein positioning of the vehicle seat occupied by the occupant in the vehicle and the length of extracted webbing, in particular the reference variable for the length of extracted webbing, are measured and safety devices of the vehicle occupant restraint system are adjusted as a function of these measured values.

34. The method of claim 1, wherein the seat belt retractor is set in blocking readiness when a given webbing extraction length is exceeded.

* * * * *